United States Patent
Kim et al.

(10) Patent No.: US 8,021,788 B2
(45) Date of Patent: Sep. 20, 2011

(54) SECONDARY BATTERY HAVING ELECTRODE FOR IMPROVEMENT OF STABILITY DURING OVERCHARGE

(75) Inventors: Bo Hyun Kim, Seoul (KR); Kwangho Yoo, Daejeon (KR); Hyunwoo Park, Daejeon (KR); Jisang Yu, Daejeon (KR); Sung Hyun Lim, Daejeon (KR)

(73) Assignee: LG Chem, Ltd. (KR)

( * ) Notice: Subject to any disclaimer, the term of this patent is extended or adjusted under 35 U.S.C. 154(b) by 335 days.

(21) Appl. No.: 12/227,570

(22) PCT Filed: May 19, 2007

(86) PCT No.: PCT/KR2007/002446
§ 371 (c)(1),
(2), (4) Date: Apr. 15, 2009

(87) PCT Pub. No.: WO2007/136206
PCT Pub. Date: Nov. 29, 2007

(65) Prior Publication Data
US 2010/0021821 A1 Jan. 28, 2010

(30) Foreign Application Priority Data
May 22, 2006 (KR) .................. 10-2006-0045439

(51) Int. Cl.
*H01M 2/16* (2006.01)
*H01M 4/12* (2006.01)
(52) U.S. Cl. .................................. 429/248; 429/231.95
(58) Field of Classification Search .................. 429/248, 429/231.95
See application file for complete search history.

(56) References Cited

U.S. PATENT DOCUMENTS

| | | | |
|---|---|---|---|
| 5,705,291 A | 1/1998 | Amatucci et al. | |
| 5,716,421 A | 2/1998 | Pendalwar et al. | |
| 6,074,776 A | 6/2000 | Mao et al. | |
| 6,440,608 B1 | 8/2002 | Yoshioka et al. | |
| 2011/0058295 A1* | 3/2011 | Wang et al. .................. | 361/79 |

FOREIGN PATENT DOCUMENTS

| | | |
|---|---|---|
| JP | 9-55210 A | 2/1997 |
| JP | 10-106545 A | 4/1998 |
| JP | 11-16566 A | 1/1999 |
| JP | 11-185758 A | 7/1999 |
| JP | 2002-164206 A | 6/2002 |
| JP | 2002-215909 A | 8/2002 |
| KR | 20010101298 | 11/2001 |
| KR | 20030058406 | 7/2003 |
| KR | 20040037154 A | 5/2004 |
| KR | 10-2006-0037850 A | 5/2006 |
| KR | 20060047152 | 5/2006 |
| KR | 20060110782 | 10/2006 |

* cited by examiner

*Primary Examiner* — Ula C. Ruddock
*Assistant Examiner* — Thomas H. Parsons
(74) *Attorney, Agent, or Firm* — Lerner, David, Littenberg, Krumholz & Mentlik, LLP (57) ABSTRACT

Disclosed herein is a secondary battery including an electrode assembly that can be charged and discharged, wherein the electrode assembly includes an electrode ('safety electrode') composed of a material that effects an electrochemical reaction when the secondary battery is overcharged (Overcharge reaction material'). The safety electrode according to the present invention is not directly added to components related to the operation of the secondary battery. Consequently, the safety electrode does not deteriorate the performance of the battery during the normal operation of the battery, and the safety electrode consumes the overcharge current through the electrochemical reaction, when the battery is overcharged, whereby the safety of the battery is fundamentally secured.

9 Claims, 7 Drawing Sheets

SECONDARY BATTERY HAVING ELECTRODE FOR IMPROVEMENT OF STABILITY DURING OVERCHARGE

CROSS REFERENCE TO RELATED APPLICATION

The present application is a national phase entry under 35 U.S.C. §371 of International Application No. PCT/KR2007/002446, filed May 19, 2007, published in English, which claims priority from Korean Patent Application No. 10-2006-0045439, filed May 22, 2006. The disclosure of said applications are incorporated by reference herein.

FIELD OF THE INVENTION

The present invention relates to a secondary battery including an electrode for improving the safety of the secondary battery when the secondary battery is overcharged, and, more particularly, to a secondary battery including an electrode that does not act during the normal operation of the battery but consumes overcharge current through the electrochemical reaction, when the battery is overcharged, thereby improving the safety of the battery.

BACKGROUND OF THE INVENTION

As mobile devices have been increasingly developed, and the demand for such mobile devices has increased, the demand for batteries has also sharply increased as an energy source for the mobile devices. Accordingly, much research on batteries satisfying various needs has been carried out. Especially, the demand for lithium secondary batteries, such as lithium ion batteries and lithium ion polymer batteries, having high energy density, high discharge voltage, and high output stability, is very high.

One of the principal problems to be solved in connection with the lithium secondary battery is to improve the safety of the battery. For example, the interior temperature and pressure of the lithium secondary battery may be greatly increased due to the abnormal operation of the battery, such as an internal short circuit, overcharge exceeding allowable current and voltage, exposure to high temperature, dropping, pressing, and nail penetration. According to circumstances, the battery may catch fire or explode.

Therefore, a method of mounting a protection circuit or a protection element and a method of using thermal choking through a separator have been proposed as a method of improving the safety of the battery. However, the use of the protection circuit acts as a great restriction in reducing the size and manufacturing costs of a battery pack. Especially when the protection circuit malfunctions, it is not possible to secure the safety of the battery when the battery is overcharged. Consequently, the use of the protection circuit is not a fundamental solution. On the other hand, the thermal chocking mechanism through the separator does not effectively operate when the generation of heat rapidly progresses.

In addition, a method of adding an organic electrolytic solution has been proposed to solve the safety-related problem of the battery. For example, U.S. Pat. No. 6,074,776 discloses an example of overcharge prevention using a monomer that can be polymerized. Furthermore, Japanese Patent Application Publication No. 2002-215909 discloses an example of 1 to 10 weight percent of a side-chain polycyclic aromatic compound and benzene compound to an organic solvent. When the organic electrolyte additive is used, however, the performance of the battery is deteriorated during the normal operation of the battery.

Also, Japanese Patent Application Publication No. 2002-164206 discloses a method of preventing overcharge, which is different from the above-mentioned method of using the electrolyte additive. According to this method, a conducting agent, such as carbon black, and a binder are previously applied to a cathode current collector, and then a cathode active material and a binder are applied to the cathode current collector. In this case, the resistance of the conducting agent layer increases by approximately 100 times, when the battery is overcharged, to interrupt electric current. Besides, there have been proposed methods of modifying the surface of an active material to improve the safety of the battery. For example, Japanese Patent Application Publication No. 1997-055210 discloses a cathode active material manufactured by coating lithium-nickel oxide with alkoxide, such as Co, Al, or Mn, and heat-treating the lithium-nickel oxide. Japanese Patent Application Publication No. 1999-016566 discloses lithium-based oxides coated with metal, such as Ti, Sn, Cu, Si, Ga, W, Zr, B, or Mo, and oxides thereof. Japanese Patent Application Publication No. 1999-185758 discloses a cathode active material manufactured by coating lithium-manganese oxide with metal oxide, using a co-precipitation method, and heat-treating the lithium-manganese oxide.

However, the above-described methods do not increase the initial temperature at which the reaction between the surface of the active material and an electrolyte occurs, i.e., the temperature at which oxygen, coupled with the metal of the cathode active material, is separated from the metal of the cathode active material (exothermic temperature), during the charge of the battery. In addition, the above-described methods do not reduce the amount of heat generated.

U.S. Pat. No. 5,705,291 discloses a method of increasing the structural stability of a cathode active material by coating the cathode active material with a compound including borate, aluminate, silicate, or a mixture thereof. However, this method does not sufficiently improve the structural stability of the cathode active material.

Furthermore, a method of adding a material for improving the safety of a battery to an electrode active material or coating the electrode active material with such a safety improving material does not solve the fundamental problem in that the performance of the battery is deteriorated during the normal operation of the battery. Also, the material is directly added to components related to the operation of the battery, and therefore, the amount of the material added is restricted.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when a battery includes an additional electrode composed of a material that effects an electrochemical reaction when the battery is overcharged, the additional electrode does not affect the operating mechanism of the battery, during the normal operation of the battery, but consumes the overcharge current through the electrochemical reaction, when the battery is overcharged, whereby the safety of the battery is increased, and, in addition, it is possible to include a large amount of the material that effects the electrochemical reaction when the battery is overcharged. The present invention has been completed based on these findings.

In accordance with the present invention, the above and other objects can be accomplished by the provision of a secondary battery including an electrode assembly that can be charged and discharged, wherein the electrode assembly includes an electrode ('safety electrode') composed of a material that effects an electrochemical reaction when the secondary battery is overcharged ('overcharge reaction material').

The safety electrode does not contain any electrode active material, unlike other electrodes of the electrode assembly. Consequently, the safety electrode is characterized in that the safety electrode does not act during the normal operation of the battery but act when the battery is overcharged. The operating mechanism of the battery is based on that battery ions, such as lithium ions, are absorbed to or discharged from a cathode active material and an anode active material via a separator and electrolyte during the charge and discharge of the battery. Consequently, when the overcharge reaction material is added to components related to the operation of the battery, the operation of the battery is inevitably affected. According to the present invention, on the other hand, the overcharge reaction material is included in the secondary battery in the form of an additional electrode such that the overcharge reaction material does not affect the operating mechanism of the battery. Consequently, the present invention fundamentally solves the above-described problem. In addition, it is possible to include a large amount of the overcharge reaction material.

The electrode assembly is not particularly restricted so long as the electrode assembly includes a cathode and anode. For example, the electrode assembly may be a jelly-roll or stacking type electrode assembly having a cathode/separator/anode structure. The jelly-roll type electrode assembly is constructed in a structure in which a cathode, having a cathode active material applied to a sheet-type current collector, and an anode, having an anode active material applied to a sheet-type current collector, are wound in the form of a roll, while a porous separator sheet is disposed between the cathode and the anode. The stacking type electrode assembly is constructed in a structure in which a plurality of unit assembles, each of which includes a cathode/separator/anode structure, are sequentially stacked.

According to the present invention, the safety electrode is included in the electrode assembly such that the safety electrode constitutes a part of the electrode assembly. For the jelly-roll type electrode assembly, the safety electrode may constitute a part or the whole of one wound layer of the electrode assembly. For the stacking type electrode assembly, the safety electrode may constitute one or two electrode layers of the electrode assembly. Preferably, the electrode assembly is the stacking type electrode assembly, and the safety electrode constitutes the outermost electrode layer of the electrode assembly.

The safety electrode may be constructed in various structures. For example, the safety electrode may constructed in a structure in which the overcharge reaction material is applied to at least one major surface of a current collector, made of a metal sheet or in a structure in which a metal piece, as an electrode terminal, is connected to an electrode-shaped structure, made of the overcharge reaction material, although the safety electrode is not limited to the above-described structures. The former structure is preferred. In this case, the metal sheet may be equal to the current collector, which will be described below.

The overcharge reaction material is not particularly restricted so long as the overcharge reaction material consumes overcharge current through the electrochemical reaction, when the battery is overcharged, thereby improving the safety of the battery. The electrochemical reaction may include at least one of decomposition, polymerization, condensation, phase transformation, etc. In a preferred embodiment, the overcharge reaction material is a polyurethane-based material that is decomposed at an overcharge voltage.

The polyurethane-based material may be manufactured using various kinds of monomers and methods.

For example, polyurethane may be manufactured through the bulk or suspension polymerization of a polyol compound and an isocyanate compound. Among the molecular structure polyurethane, the polyol compound constituting the soft segment of polyurethane may be polyethylene glycol (PEG), polypropylene glycol (PPG), polyisobutylene glycol, polytetramethylene glycol (PTMG), polycaprolactone, polyethylene adipate, or glycerine. As the isocyanate compound which is the hard segment of polyurethane, on the other hand, there may be used 4,4-diphenylmethane diisocyanate (MDI), 2,4-, 2,6-toluene diisocyanate (TDI), 4,4-dicyclohexylmethane diisocyanate ($H_{12}$MDI), trans-1,4-cyclohexane diisocyanate (CHDI), isophorone diisocyanate (IPDI:), tetramethyl-1,3-xylene diisocyanate (TMXDI), dimeryl diisocyanate (DDI) and hexamethylene diisocyanate (HMDI). According to circumstances, catalysts such as 1,4-diazabicyclo octane and dibutyltin dilaurate, and a chain extender such as 1,4-butanediol may be additionally employed to adjust the structure and physical properties of polyurethane. Although there is no particular limit to a molecular weight range of polyurethane, those having a molecular weight of several tens of thousands to several hundreds of thousands may be used.

The content of the overcharge reaction material in the battery is decided based on various factors, such as the operating condition of the battery and the size of the battery. Preferably, the content of the overcharge reaction material is decided in the range in which the electric capacity of the battery is greatly reduced as compared to the size of the battery. Consequently, the content of the overcharge reaction material is not particularly restricted. According to the present invention, furthermore, the overcharge reaction material is included in the battery in the form of the safety electrode. Consequently, it is possible to add a relatively large amount of overcharge reaction material if necessary.

The overcharge condition of the present invention may be changed depending upon the construction of the secondary battery. Preferably, the overcharge voltage is 5.0 V or more when the secondary battery has a rated voltage of 4.0 to 4.5 V.

As an example of the battery according to the present invention, mention may be made of a prismatic battery and pouch-shaped battery having an electrode assembly, including the safety electrode, mounted therein. Especially, a pouch-shaped battery having an electrode assembly mounted in a battery case made of a laminate sheet including metal layer and a resin layer is preferred. Also, the battery according to the present invention is preferably applied to a lithium secondary battery having a low safety.

The lithium secondary battery includes a cathode, an anode, a separator, and a lithium salt-containing, non-aqueous electrolyte.

The cathode is manufactured, for example, by applying a mixture of a cathode active material, a conducting agent, and a binder to a cathode current collector, and drying the cathode current collector. According to circumstances, a filler may be added to the mixture.

The cathode active material may be, but is not limited to, a layered compound, such as lithium cobalt oxide ($LiCoO_2$) or lithium nickel oxide ($LiNiO_2$) or a compound replaced by one or more transition metals; lithium manganese oxide represented by a chemical formula $Li_{1+x}Mn_{2-x}O_4$ (where, x=0 to 0.33) or lithium manganese oxide, such as $LiMnO_3$, $LiMn_2O_3$, or $LiMnO_2$; lithium copper oxide ($Li_2CuO_2$); vanadium oxide, such as $LiV_3O_8$, $LiFe_3O_4$, $V_2O_5$, or $Cu_2V_2O_7$; Ni-sited lithium nickel oxide represented by a chemical formula $LiNi_{1-x}M_xO_2$ (where, M=Co, Mn, Al, Cu, Fe, Mg, B, or Ga, and x=0.01 to 0.3); lithium manganese composite oxide represented by a chemical formula $LiMn_{2-x}M_xO_2$ (where, M=Co, Ni, Fe, Cr, Zn, or Ta, and x=0.01 to 0.1) or a chemical formula $Li_2Mn_3MO_8$ (where, M=Fe, Co, Ni, Cu, or Zn); $LiMn_2O_4$ having Li of a chemical formula partially replaced by alkaline earth metal ions; a disulfide compound; or $Fe_2(MoO_4)_3$.

Generally, the cathode current collector has a thickness of 3 to 500 μm. The cathode current collector is not particularly restricted so long as the cathode current collector has high conductivity while the cathode current collector does not induce any chemical change in the battery. For example, the cathode current collector may be made of stainless steel, aluminum, nickel, titanium, or plastic carbon. Alternatively, the cathode current collector may be made of aluminum or stainless steel the surface of which is treated with carbon, nickel, titanium, or silver. The cathode current collector may have micro concavo-convex parts formed at the surface thereof so as to increase the attaching force of the cathode active material. The cathode current collector may be constructed in various forms, such as a film, a sheet, a foil, a net, a porous body, a foam body, and a non-woven fabric body.

The conducting agent is generally added such that the conducting agent has 1 to 50 weight percent based on the total weight of the compound including the cathode active material. The conducting agent is not particularly restricted so long as the conducting agent has high conductivity while the conducting agent does not induce any chemical change in the battery. For example, graphite, such as natural graphite or artificial graphite; carbon blacks, such as carbon black, acetylene black, Ketjen black, channel black, furnace black, lamp black and thermal black; conductive fibers, such as carbon fibers and metallic fibers; metallic powders, such as carbon fluoride powder, aluminum powder and nickel powder; conductive whiskers, such as zinc oxide and potassium titanate; conductive metal oxides, such as titanium oxide; and polyphenylene derivatives may be used as the conducting agent.

The binder for the cathode active material is a component assisting in binding between the active material and conductive agent, and in binding with the current collector. The binder according to the present invention is typically added in an amount of 1 to 50 weight % based on the total weight of the compound including the cathode active material. As examples of the binder, there may be used polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the cathode. There is no particular limit to the filler so long as it does not cause chemical changes in the battery and is a fibrous material. As examples of the filler, there may be used olefin polymers, such as polyethylene and polypropylene; and fibrous materials, such as glass fiber and carbon fiber.

On the other hand, the anode is manufactured by applying an anode active material to an anode current collector, and drying the cathode current collector. According to circumstances, the conducting agent, the binder, and the filler, which were previously described, may be added to the anode active material.

Generally, the anode current collector has a thickness of 3 to 500 μm. The anode current collector is not particularly restricted so long as the anode current collector has high conductivity while the anode current collector does not induce any chemical change in the battery. For example, the anode current collector may be made of copper, stainless steel, aluminum, nickel, titanium, or plastic carbon. Alternatively, the anode current collector may be made of copper or stainless steel the surface of which is treated with carbon, nickel, titanium, or silver, or an aluminum-cadmium alloy. Like the cathode current collector, the anode current collector may have micro concavo-convex parts formed at the surface thereof so as to increase the attaching force of the anode active material. The anode current collector may be constructed in various forms, such as a film, a sheet, a foil, a net, a porous body, a foam body, and a non-woven fabric body.

As the anode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is interposed between the anode and the cathode. As the separator, an insulative thin film having high ion permeability and mechanical strength is used. The separator typically has a pore diameter of 0.01 to 10 μm and a thickness of 5 to 300 μm. As the separator, sheets or non-woven fabrics made of an olefin polymer, such as polypropylene, or glass fibers or polyethylene, which has chemical resistance and hydrophobicity, are used. When a solid electrolyte, such as a polymer, is employed as the electrolyte, the solid electrolyte may also serve as both the separator and the electrolyte.

The lithium salt-containing, non-aqueous electrolyte is composed of a non-aqueous electrolyte and lithium. As the non-aqueous electrolyte, a non-aqueous electrolytic solution, solid electrolyte or inorganic solid electrolyte may be used.

As examples of the non-aqueous electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides and sulphates of lithium, such as $Li_3N$, LiI, $Li_5NI_2$, $Li_3N$—LiI—LiOH, $LiSiO_4$, LiSiO$_4$—LiI—LiOH, Li$_2$SiS$_3$, Li$_4$SiO$_4$, Li$_4$SiO$_4$—LiI—LiOH and Li$_3$PO$_4$—Li$_2$S—SiS$_2$.

The lithium salt is a material that is readily soluble in the above-mentioned non-aqueous electrolyte, and may include, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate, and imide.

Additionally, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. According to circumstances, in order to impart incombustibility, the non-aqueous electrolyte may further include halogen-containing solvents, such as carbon tetrachloride and ethylene trifluoride. Furthermore, in order to improve high-temperature storage characteristics, the non-aqueous electrolyte may additionally include carbon dioxide gas.

BRIEF DESCRIPTION OF THE DRAWINGS

The above and other objects, features and other advantages of the present invention will be more clearly understood from the following detailed description taken in conjunction with the accompanying drawings, in which.

<Description of Main Reference Numerals of the Drawings>

| | | | |
|---|---|---|---|
| 100: | pouch-shaped secondary battery | 200: | battery case |
| 300: | stacking type electrode assembly | 310: | cathode |
| | | 330: | separator |
| 320: | anode | 400, 410: | electrode terminals |
| 340: | safety electrode | | |
| 500: | insulative film | | |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
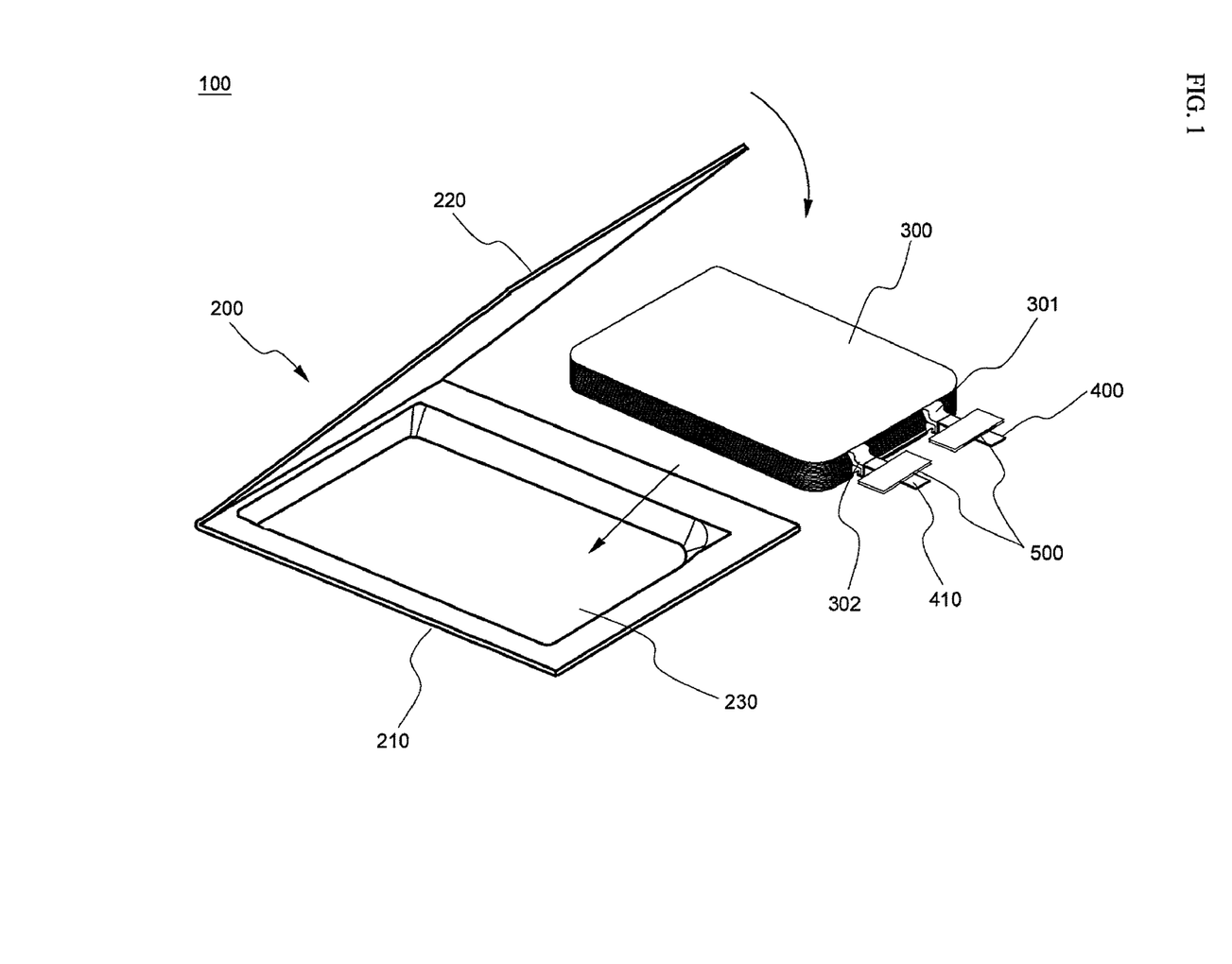
FIG. 1 is a typical view illustrating a pouch-shaped secondary battery including a stacking type electrode assembly according to a preferred embodiment of the present invention.
Figure 2:
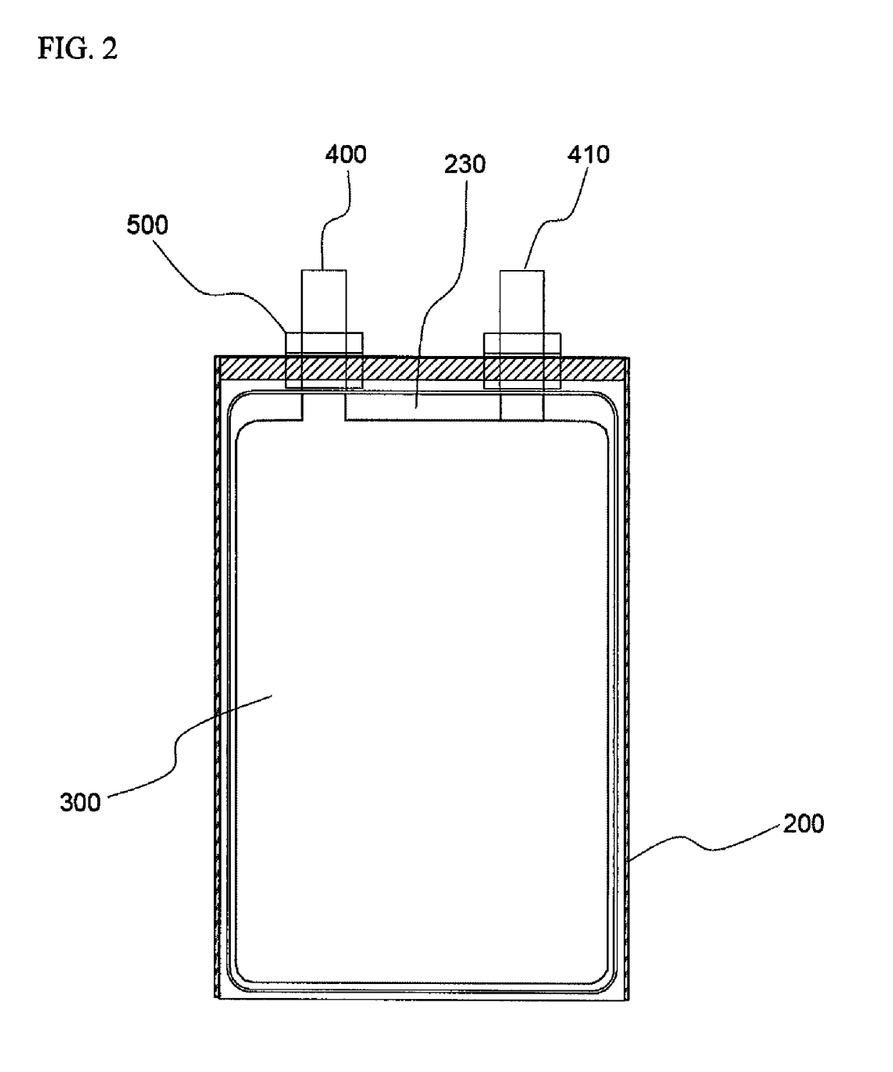
FIG. 2 is a plan see-through view illustrating the secondary battery of FIG. 1 after the secondary battery is assembled.

FIG. 1 is a typical view illustrating the structure of a pouch-shaped secondary battery including a stacking type electrode assembly according to a preferred embodiment of the present invention, and FIG. 2 is a plan see-through view illustrating the secondary battery of FIG. 1 after the secondary battery is assembled.

Referring to FIGS. 1 and 2, the pouch-shaped secondary battery 100 is constructed in a structure in which an electrode assembly 300, including cathodes, anodes, and solid electrolyte coated separators disposed respectively between the cathodes and the anodes, is mounted in a pouch-shaped battery case 200 in a sealed fashion while two electrode terminals 400 and 410, electrically connected to cathode and anode taps 301 and 302 of the electrode assembly 300, are exposed from the battery case 200.

The battery case 200 is made of a soft wrapping material, such as an aluminum laminate sheet. The battery case 200 includes a case body 210 having a hollow receiving part 230 for receiving the electrode assembly 300 and a cover 220 integrally connected to the case body 210. The receiving part 230 of the battery case 200 may be obtained by forming a plate-shaped laminate sheet, for example, using a mold having a shape corresponding to the receiving part 230 of the battery case 200, such that the electrode assembly 300 is located in the receiving part 230 of the battery case 200.

The stacking type electrode assembly 300 is constructed as follows. A plurality of cathode taps 301 are welded to one another, and the welded cathode taps 301 are coupled to one of the electrode terminals 400. Also, a plurality of anode taps 302 are welded to one another, and the welded anode taps 302 are coupled to the other electrode terminal 410. To the upper and lower surfaces of the respective electrode terminals 400 and 410 are attached insulative films 500 for accomplishing the electrical insulation and sealability between the battery case 200 and the electrode terminals 400 and 410.

Figure 3:
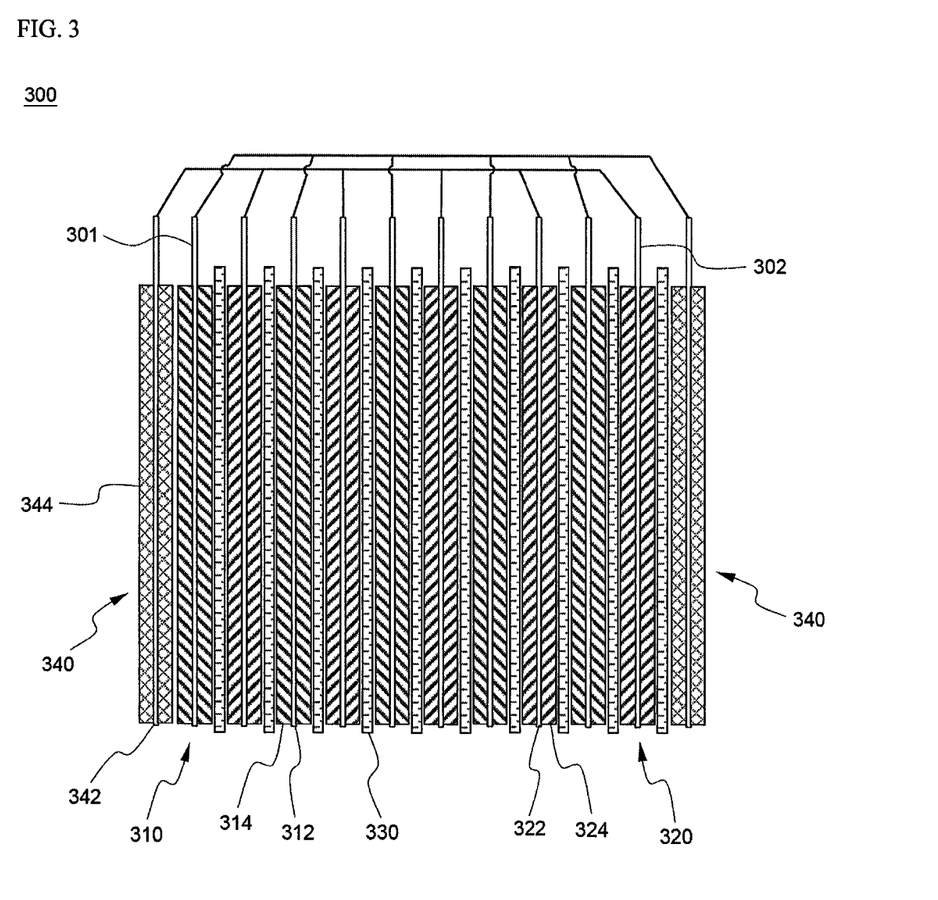
FIG. 3 is a typical view illustrating an exemplary structure of the electrode assembly of FIG. 1.

FIG. 3 is a typical view illustrating an exemplary structure of the electrode assembly of FIG. 1.

Referring to FIG. 3, the stacking type electrode assembly 300 is constructed in a structure in which cathodes 310 and anodes 320 are sequentially stacked while separators 330 are disposed respectively between the cathodes 310 and the anodes 320. Each cathode 310 is constructed in a structure in which a cathode active material 314, such as lithium metal oxide, is applied to opposite major surfaces of a current collector 312, made of aluminum. Each anode 320 is constructed in a structure in which an anode active material 324, such as graphite, is applied to opposite major surfaces of a current collector 322, made of copper. From the upper ends of the respective cathode and anode current collectors 312 and 314 protrude electrode taps 301 and 302, which are connected in parallel with each other.

Safety electrodes 340 constitute the outermost layers of the electrode assembly 300. The safety electrodes 340 are electrically connected to the cathodes 310 and/or the anodes 320. Of course, only one safety electrode 340 may be disposed at one of the outermost layers of the electrode assembly 300 or disposed in the electrode assembly 300 as an intermediate layer. Each safety electrode 340 is constructed in a structure in which an overcharge reaction material 344 is applied to opposite major surfaces of a current collector 342. However, the overcharge reaction material 344 may be applied entirely or partially to one major surface of the current collector 342. The safety electrodes 340 do not act during the normal operation of the battery. Consequently, it is not necessary to dispose separators between the safety electrodes 340 and the electrodes (cathodes or anode) adjacent to the respective safety electrodes 340. For easy understanding, FIG. 3 illustrates that no separator is disposed between one of the safety electrodes 340 and the cathode 310 adjacent to the safety electrode 340, whereas the separator 330 is disposed between the other safety electrode 340 and the cathode 310 adjacent to the safety electrode 340.

Hereinafter, examples of the present invention will be described in more detail.

It should be noted, however, that the scope of the present invention is not limited by the illustrated examples.

EXAMPLE 1

1-1. Manufacture of Cathode

A cathode mixture slurry was prepared by adding 94 weight percent of $LiCoO_2$ as a cathode active material, 3.5 weight percent of Super-P (a conducting agent), and 2.5 weight percent of PVdf (a binder) to N-methyl-2-pyrrolidone (NMP) as a solvent. The cathode mixture slurry was coated on an aluminum foil, which was dried and pressed to manufacture a cathode.

1-2. Manufacture of Anode

An anode mixture slurry was prepared by adding 94 weight percent of artificial graphite as an anode active material, 1 weight percent of Super-P (a conducting agent), and 5 weight percent of PVdf (a binder) to NMP as a solvent. The anode mixture slurry was coated on a copper foil, which was dried and pressed to manufacture an anode.

1-3. Manufacture of Safety Electrode 2.45 g of polyurethane, having a molecular weight of 42,000 to 45,000, was prepared through the suspension polymerization between polyethylene glycol (PEG) and toluene diisocyanate (TDI). The prepared polyurethane was added to N-methyl-2-pyrrolidone (NMP) as a solvent. The mixture was homogenized in a homogenizer (manufactured by IKA Werke GmbH & Co. KG) for two hours. The homogenized mixture was coated on opposite major surfaces of an aluminum foil, as a cathode current collector, and a copper foil, as an anode current collector. The mixture coated aluminum and copper foils were dried at a temperature of 130° C. to manufacture safety electrodes.

1-4. Manufacture of Electrode Assembly

A separator (Cell Guard™) was disposed between the cathode, manufactured as described in Paragraph 1-1, and the anode, manufactured as described in Paragraph 1-2, to manufacture an electrode assembly. Separators were further disposed at the outermost layers of the electrode assembly, and the safety electrodes, manufactured as described in Paragraph 1-3, were located at opposite major surfaces of the electrode assembly to manufacture an electrode assembly having the safety electrodes.

1-5. Manufacture of Battery

The electrode assembly, manufactured as described in Paragraph 1-4, was impregnated with an EC/EMC-based solution, containing lithium salt, such as 1M $LiPF_6$, as an electrolytic solution, to manufacture a lithium secondary battery.

COMPARATIVE EXAMPLE 1

A battery was manufactured in the same manner as Example 1 except that polyurethane was not added to the safety electrodes.

EXPERIMENTAL EXAMPLE 1

The batteries manufactured according to Example 1 and Comparative example 1 were continuously overcharged in a severe overcharge condition of 6 C rate and 20 V. During the overcharge of the batteries, the temperature and voltage of the batteries were measured. The experiment results are shown in FIGS. 4 and 5.

Figure 4:
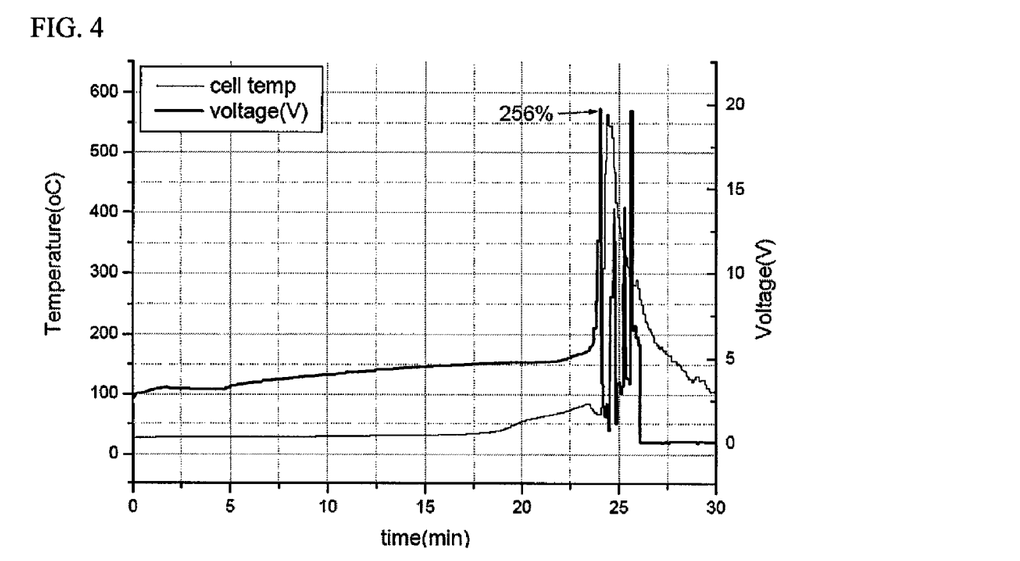
FIG. 4 is a graph illustrating the change in temperature and voltage of a battery including a safety electrode according to Example 1 in an overcharge condition of 6 C rate and 20V.
Figure 5:
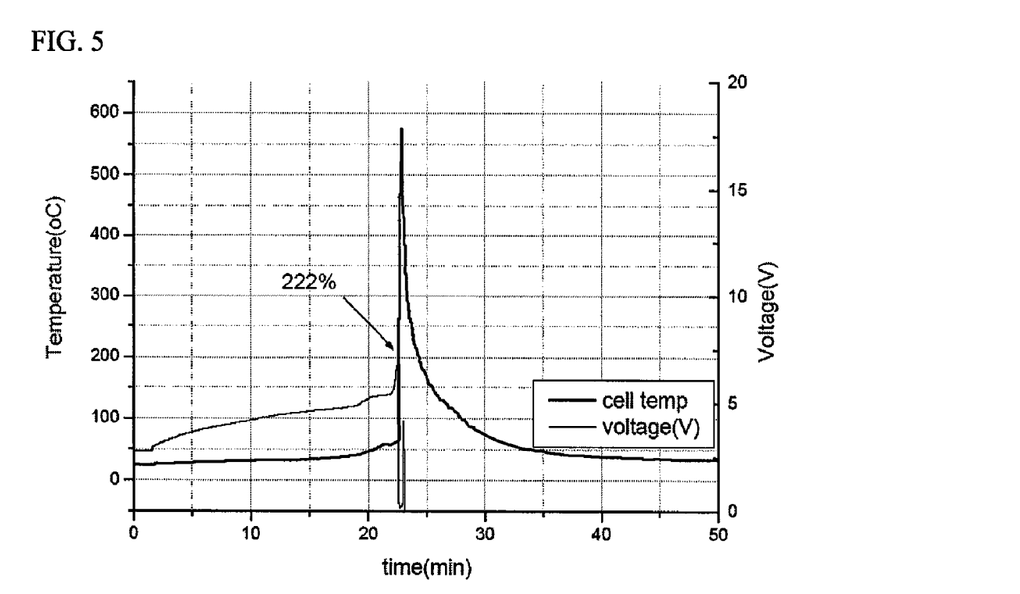
FIG. 5 is a graph illustrating the change in temperature and voltage of a battery according to Comparative example 1 in an overcharge condition of 6 C rate and 20V.

The graphs of FIGS. 4 and 5 revealed that, when the batteries were overcharged in the severe overcharge condition of 6 C rate and 20 V, the voltage and temperature of the battery manufactured according to Example 1 abruptly increased at a point of time when approximately 24 minutes have elapsed (FIG. 4), whereas the voltage and temperature of the battery manufactured according to Comparative example 1 abruptly increased at a point of time when approximately 22 minutes have elapsed (FIG. 5). The abrupt increase of the temperature means the combustion of the battery. For the battery manufactured according to Example 1, the polyurethane of the safety electrodes was decomposed to consume the overcharge current when the battery was overcharged. Consequently, the experiment results revealed that the abrupt increase in temperature of the battery manufactured according to Example 1 was delayed, in the severe overcharge condition of 6 C rate and 20 V, as compared to the battery manufactured according to Comparative example 1, whereby the safety of the battery manufactured according to Example 1 was secured.

EXPERIMENTAL EXAMPLE 2

The batteries manufactured according to Example 1 and Comparative example 1 were continuously overcharged in an overcharge condition of 1 C rate and 20 V. During the overcharge of the batteries, the temperature and voltage of the batteries were measured. The experiment results are shown in FIGS. 6 and 7.

Figure 6:
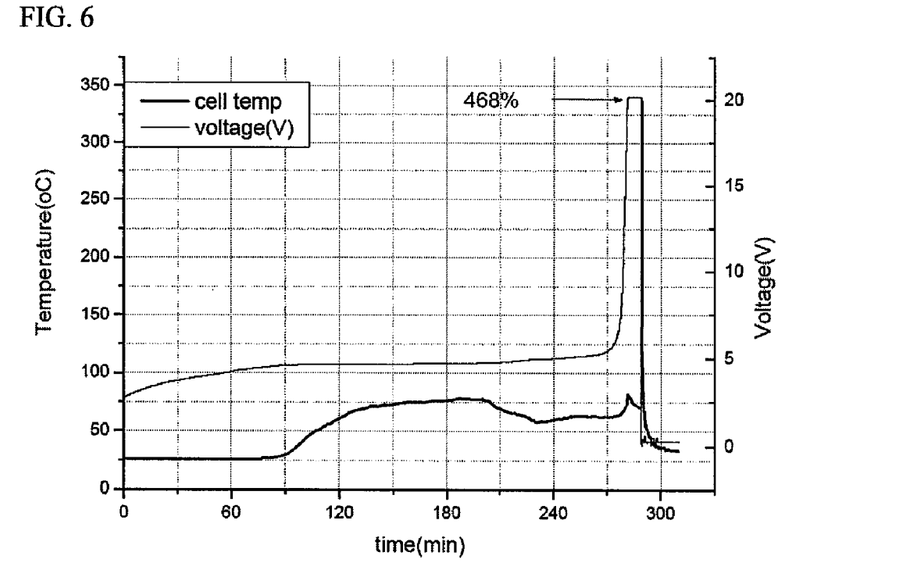
FIG. 6 is a graph illustrating the change in temperature and voltage of a battery including a safety electrode according to Example 1 in an overcharge condition of 1 C rate and 20V.
Figure 7:
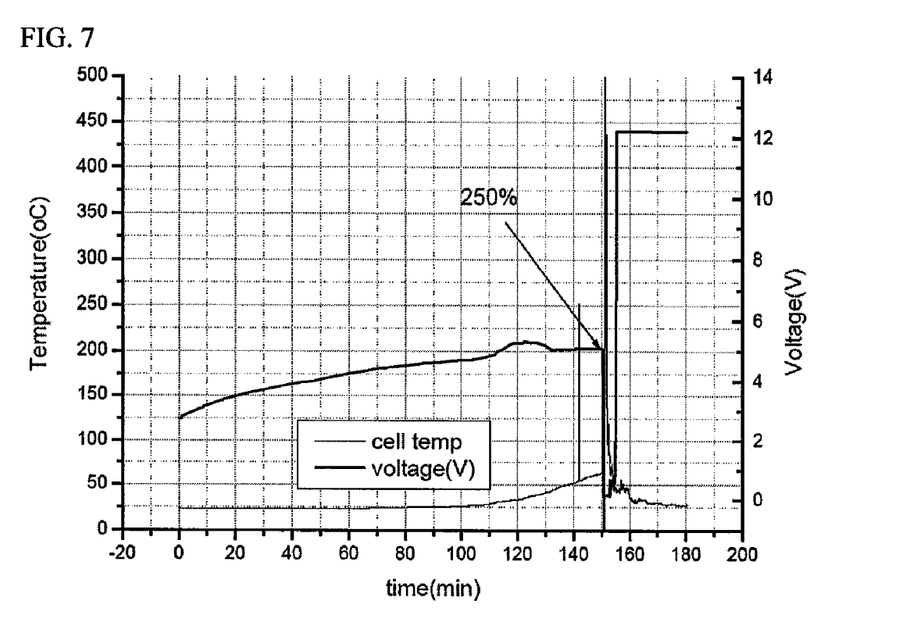
FIG. 7 is a graph illustrating the change in temperature and voltage of a battery according to Comparative example 1 in an overcharge condition of 1 C rate and 20V.

The graphs of FIGS. 6 and 7 revealed that, when the batteries were overcharged in the overcharge condition of 1 C rate and 20 V, the voltage and temperature of the battery manufactured according to Example 1 abruptly increased at a point of time when approximately 280 minutes have elapsed (FIG. 6), whereas the voltage and temperature of the battery manufactured according to Comparative example 1 abruptly increased at a point of time when approximately 150 minutes have elapsed (FIG. 7). The battery manufactured according to Example 1 had a flat section of approximately 5 V between a point of time when the temperature of the battery manufactured according to Comparative example 1 has abruptly increased, i.e., a point of time when approximately 150 minutes have elapsed, and a point of time when the temperature of the battery manufactured according to Example 1 has abruptly increased, i.e., a point of time when approximately 280 minutes have elapsed. In this flat section of the battery manufactured according to Example 1, the polyurethane of the safety electrodes was continuously decomposed at a potential of 5 V. Consequently, the experiment results revealed that the abrupt increase in temperature of the battery manufactured according to Example 1 was delayed by two hours or more as compared to the battery manufactured according to Comparative example 1 by virtue of the decomposition of the polyurethane of the safety electrodes of the battery manufactured according to Example 1.

EXAMPLE 2

A battery was manufactured in the same manner as Example 1 except that 1.90 g of polyurethane was added to the safety electrodes.

EXAMPLE 3

A battery was manufactured in the same manner as Example 1 except that 1.17 g of polyurethane was added to the safety electrodes.

EXAMPLE 4

A battery was manufactured in the same manner as Example 1 except that 0.68 g of polyurethane was added to the safety electrodes.

EXPERIMENTAL EXAMPLE 3

The batteries manufactured according to Example 2, Example 3, Example 4, and Comparative example 1 were continuously overcharged in an overcharge condition of 1 C rate and 12 V. During the overcharge of the batteries, the temperature and voltage of the batteries were measured. The experiment results are shown in FIGS. 8 to 11.

Figure 8:
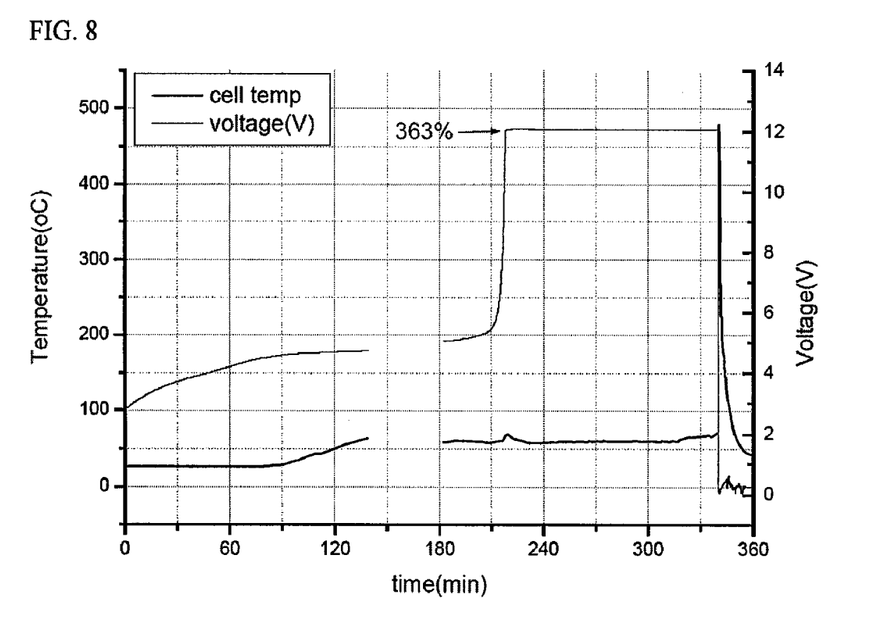
FIG. 8 is a graph illustrating the change in temperature and voltage of a battery including a safety electrode according to Example 2 in an overcharge condition of 1 C rate and 12V.
Figure 9:
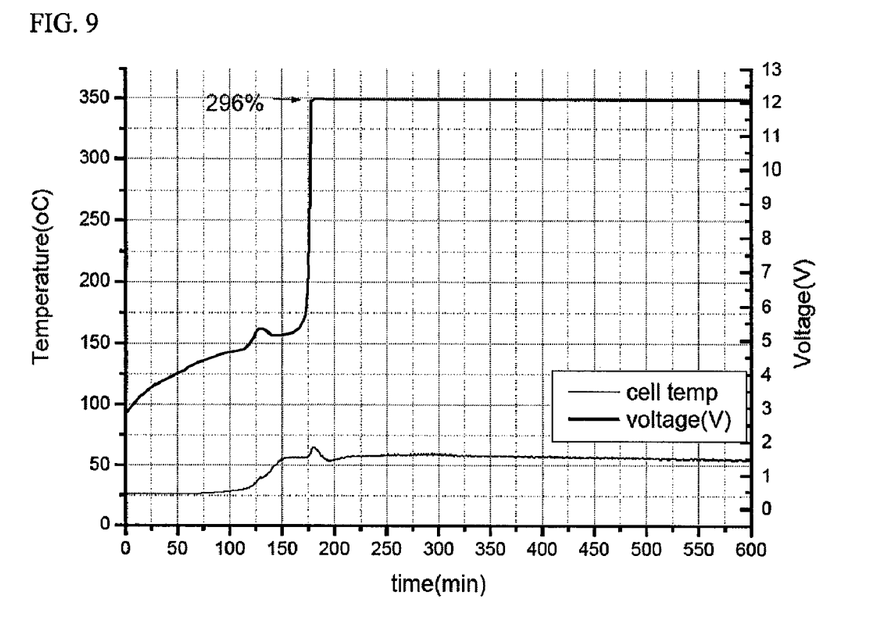
FIG. 9 is a graph illustrating the change in temperature and voltage of a battery including a safety electrode according to Example 3 in an overcharge condition of 1 C rate and 12V.
Figure 10:
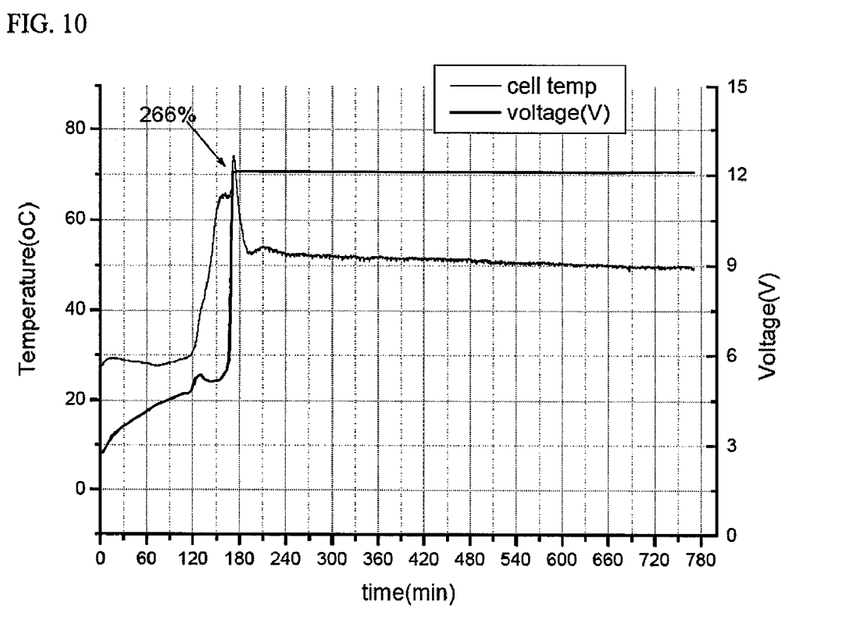
FIG. 10 is a graph illustrating the change in temperature and voltage of a battery including a safety electrode according to Example 4 in an overcharge condition of 1 C rate and 12V.
Figure 11:
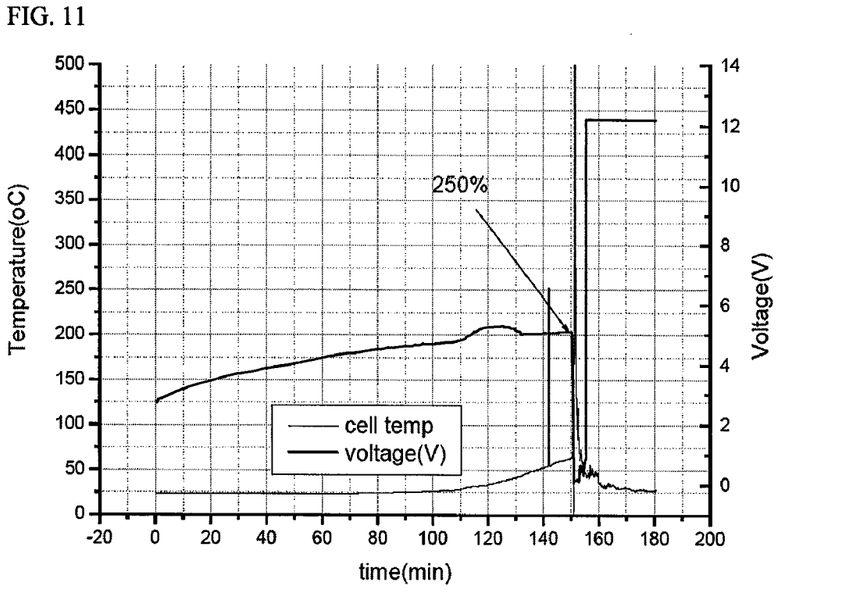
FIG. 11 is a graph illustrating the change in temperature and voltage of a battery according to Comparative example 1 in an overcharge condition of 1 C rate and 12V.

The graphs of these drawings revealed that, when the batteries were overcharged in the overcharge condition of 1 C rate and 20 V, i.e., a relatively low overcharge condition, the temperature of the battery manufactured according to Example 2 abruptly increased at a point of time when approximately 340 minutes have elapsed (FIG. 8). The temperature of the battery manufactured according to Example 3 increased at a point of time when approximately 180 minutes have elapsed (FIG. 9); however, the temperature of the battery manufactured according to Example 3 did not exceed 100° C. Also, the temperature of the battery manufactured according to Example 4 increased at a point of time when approximately 160 minutes have elapsed (FIG. 10); however, the temperature of the battery manufactured according to Example 4 did not exceed 100° C. Consequently, the experiment results revealed that the secondary batteries according to the present invention did not catch fire in the above-specified overcharge condition or caught fire at a point of time when a fairly great deal of time had elapsed. It should be noted, however, that the combustion of the batteries is affected by other factors in addition to the polyurethane contents of the safety electrodes, and therefore, the combustion of the batteries is somewhat variable.

On the other hand, the experiment results revealed that the temperature of the battery manufactured according to Example 3 abruptly increased at a point of time when approximately 150 minutes have elapsed (FIG. 10), whereby the battery did catch fire in a short time in the above-specified overcharge condition.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the safety electrode according to the present invention is not directly added to components related to the operation of the secondary battery. Consequently, the safety electrode does not deteriorate the performance of the battery during the normal operation of the battery, and the safety electrode consumes the overcharge current through the electrochemical reaction, when the battery is overcharged, whereby the safety of the battery is fundamentally secured.

The secondary battery according to the present invention is preferably used as a unit cell of a middle- or large-sized secondary battery or battery pack having high output and large capacity, the safety of which is further considered.

What is claimed is:

1. A secondary battery including an electrode assembly that can be charged and discharged, wherein
the electrode assembly includes a safety electrode composed of an overcharge reaction material that effects an electrochemical reaction only when the secondary battery is overcharged,
wherein the safety electrode includes no electrode active material, whereby the safety electrode does not act during the normal operation of the battery, and the safety electrode is constructed in a structure in which the overcharge reaction material is applied to at least one major surface of a current collector, made of a metal sheet, or in a structure in which a metal piece, as an electrode terminal, is connected to an electrode-shaped structure, made of the overcharge reaction material.

2. The secondary battery according to claim 1, wherein the electrode assembly is a jelly-roll or stacked electrode assembly having a cathode/separator/anode structure.

3. The secondary battery according to claim 2, wherein the safety electrode constitutes a part or the whole of one wound layer of the jelly-roll electrode assembly, or the safety electrode constitutes one or two electrode layers of the stacked electrode assembly.

4. The secondary battery according to claim 2, wherein the electrode assembly is the stacked electrode assembly, and the safety electrode constitutes the outermost electrode layer of the electrode assembly.

5. The secondary battery according to claim 1, wherein the electrochemical reaction includes one or more selected from the group consisting of decomposition, polymerization, condensation, and phase transformation.

6. The secondary battery according to claim 1, wherein the overcharge reaction material is a polyurethane-based material that is decomposed at an overcharge voltage.

7. The secondary battery according to claim 6, wherein the overcharge voltage is 5.0 V or more when the secondary battery has a rated voltage of 4.0 to 4.5 V.

8. The secondary battery according to claim 1, wherein the battery is a lithium secondary battery.

9. A battery pack having high output and large capacity comprising the secondary battery according to claim 1.

* * * * *